US006939190B2

(12) United States Patent
Farrah et al.

(10) Patent No.: US 6,939,190 B2
(45) Date of Patent: Sep. 6, 2005

(54) NECK CLEANING METHOD FOR A CRT

(75) Inventors: John Stephen Farrah, Lancaster, PA (US); Donald Walter Bartch, York, PA (US); Leonard Pratt Wilbur, Jr., Lancaster, PA (US)

(73) Assignee: Thomson Licensing, Boulogne-Billancourt (FR)

( * ) Notice: Subject to any disclaimer, the term of this patent is extended or adjusted under 35 U.S.C. 154(b) by 8 days.

(21) Appl. No.: 10/677,066

(22) Filed: Oct. 1, 2003

(65) Prior Publication Data

US 2004/0072496 A1 Apr. 15, 2004

Related U.S. Application Data

(62) Division of application No. 09/997,661, filed on Nov. 29, 2001, now Pat. No. 6,669,525.

(51) Int. Cl.[7] .......................................... B29C 70/84

(52) U.S. Cl. .................................................. 445/60

(58) Field of Search ................................ 445/60, 59, 2

(56) References Cited

U.S. PATENT DOCUMENTS 3,021,851 A * 2/1962 Morin ......................... 134/46

* cited by examiner

*Primary Examiner*—Joseph Williams
(74) *Attorney, Agent, or Firm*—Joseph S. Tripoli; Harvey D. Fried; Patricia A. Verlangieri

(57) ABSTRACT

A method of cleaning the neck of a funnel of a CRT during the manufacture thereof. The method includes: inserting a drain tube within the neck, wherein a gap exists between the drain tube and the neck; directing a fluid through the gap; and draining the fluid that was directed through the gap through the drain tube, whereby the fluid removes material from the neck that was applied during a prior coating process and any dirt. The drain tube is part of a cleaning apparatus that further includes a housing and a labyrinth flow controller positioned within the housing adjacent to the drain tube forming a laminar flow section whereby fluid is directed through the housing and into the tube.

7 Claims, 3 Drawing Sheets

NECK CLEANING METHOD FOR A CRT

CROSS-REFERENCE TO RELATED APPLICATIONS

This application is a divisional of U. S. patent application Ser. No. 09/997,661 U.S. Pat. 6,669,525 entitled "Neck Cleaning Method For A CRT" filed on Nov. 29, 2001 issued Dec. 30, 2003.

FIELD OF THE INVENTION

The present invention generally relates to the manufacture of cathode ray tubes and, in particular, to a method of cleaning the neck of a cathode ray tube.

BACKGROUND

The color cathode ray tube (CRT) typically includes an electron gun, a shadow mask, and a screen. The tube has a funnel shape, i.e., a wide opening that leads to a narrow neck. The electron gun is mounted in the neck of the tube and the screen is mounted proximate to the wide opening of the funnel of the tube. The shadow mask is interposed between the electron gun and the screen. A faceplate is sealed to the wide opening of the funnel. The screen is located on an inner surface of the faceplate of the CRT. The screen has an array of three different color-emitting phosphors (e.g., green, blue and red) formed thereon. The shadow mask functions to direct electron beams generated in the electron gun toward the appropriate color emitting phosphors on the screen of the CRT.

As part of the manufacturing process for a color CRT, the inside surface of the tube is coated with a conductive coating used to carry high voltage from a location on the side of the tube to the shadow mask. One method of applying the conductive coating is to use a flow coating process. The flow coating process comprises pouring the conductive coating material into the wide opening of the funnel and allowing the material to flow out along the funnel and through the neck of the tube. The material completely coats the funnel and neck. However, to create an operational CRT, the coating cannot extend along the entire neck of the tube. As such, it is necessary to clean the coating from a portion of the neck to a controlled dimension along the neck. The transition from the uncoated to coated portions of the neck must be uniform and the neck should be free of all contaminants.

Presently, the process for cleaning the neck consists of inserting a multi-blade squeegee into the neck to a predefined distance along the neck. The squeegee is rotated to wipe the coating material from the inner surface of the neck. The problem with this system is that the squeegee wears during use and will ultimately leave streaks of coating material within the neck.

Therefore, there is a need in the art for a more effective method and apparatus for cleaning the neck of a color CRT.

SUMMARY OF THE INVENTION

A method of cleaning the neck of a funnel of a CRT during the manufacture thereof. The method comprises: inserting a drain tube within the neck, wherein the outer dimensions of the drain tube are less than the corresponding inner dimensions of the neck and a gap exists between the drain tube and the neck; directing a fluid through the gap; and draining the fluid that was directed through the gap, through the drain tube, whereby the fluid removes material and dirt from the neck.

The method utilized a cleaning apparatus, wherein the apparatus comprises: a cleaning unit having a housing that surrounds the neck; the drain tube that extends through the bottom of the housing into the neck to a predefined position within the neck which is below the top end of the housing; and a labyrinth flow controller positioned within the housing adjacent to the drain tube forming a laminar flow section whereby a flow of fluid is directed through the housing and along the interior of the neck and into the end of the drain tube.

BRIEF DESCRIPTION OF THE DRAWINGS

The invention will now be described in greater detail, with relation to the accompanying drawing, in which.

DETAILED DESCRIPTION

Figure 1:
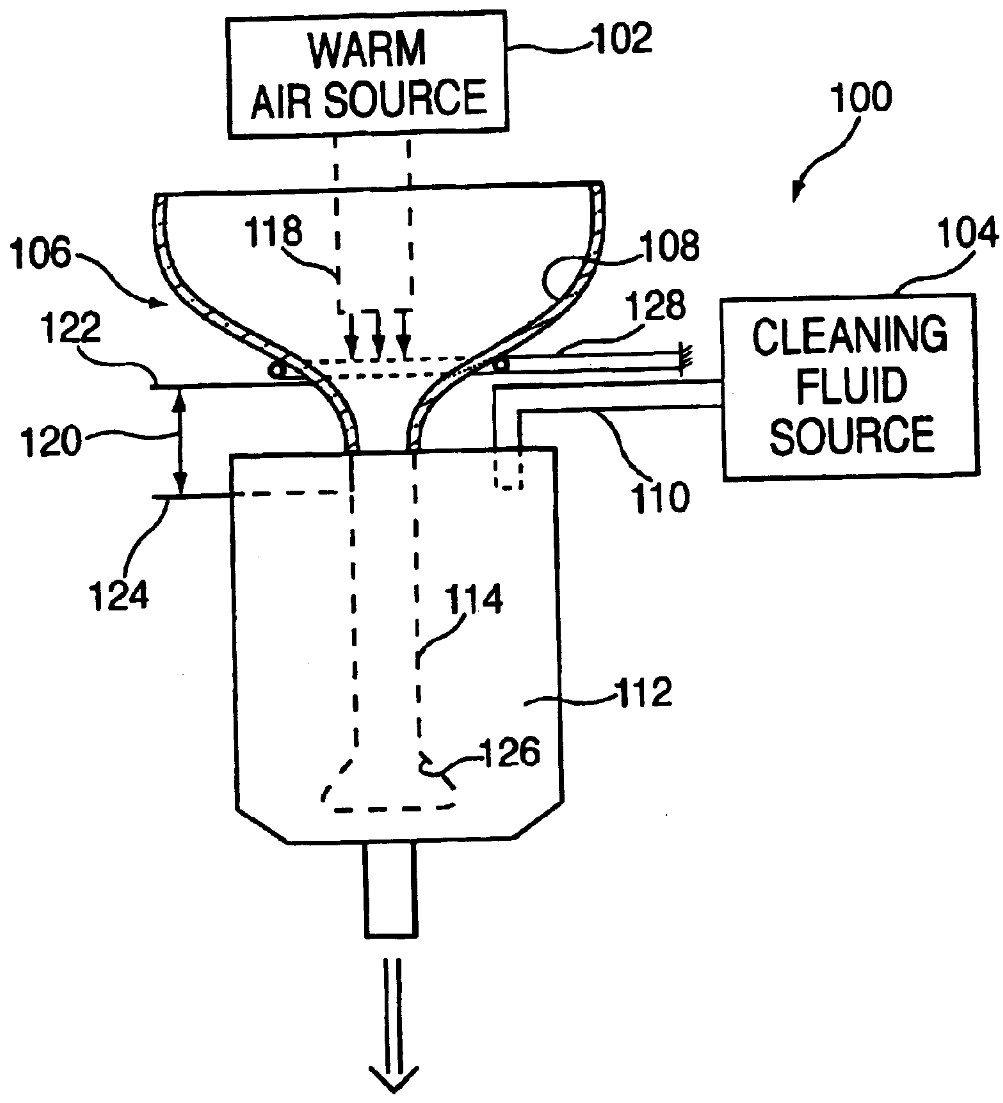
FIG. 1 is a schematic view of the apparatus for cleaning the neck of a picture tube in accordance with the present invention.

FIG. 1 depicts a schematic view of the apparatus for cleaning the neck of a tube of a CRT in accordance with the present invention. The apparatus 100 comprises a warm air source 102, a mechanism 128 for supporting the funnel 106, a cleaning fluid source 104, and a cleaning unit 112. Prior to being mounted in support mechanism 128, the funnel 106 is heated to between 50 and 55° C. before being coated with a layer 108 of graphite, iron oxide or other conductive material, along the entire inner surface of the funnel 106 and the neck 114 of the funnel 106. The coating process is conventional and well known in the art.

Once coated, the funnel 106 is mounted in the support mechanism 128 before the coating has time to fully cure. The support mechanism 128 generally supports the funnel 106 above the cleaning unit 112. Since the layer of coating material is not completely cured, the coating material can be removed using a non-caustic cleaning agent such as de-ionized water. The support mechanism 128 is positioned at location 122 above the cleaning unit 112 by a predefined distance 120. When mounted, the neck 114 is inserted into the cleaning unit 112. The distance 120 represents the length of the neck 114 that shall remain coated with the conductive coating material. The reference line 124, which is a predefined position, approximates the location up to where the coating material will be removed. Once the funnel 106 is mounted, a warm air source 102 blows heated air toward the inner surface of the funnel 106. A conduit 118 directs the warm air toward the neck 114. Cleaning fluid source 104 provides cleaning fluid through the conduit 110 to the cleaning unit 112. The flow of cleaning fluid through the cleaning unit 112 causes any dirt and the conductive coating within the neck to be removed (cleaned) completely from the neck and up to the reference line 124.

Figure 2:
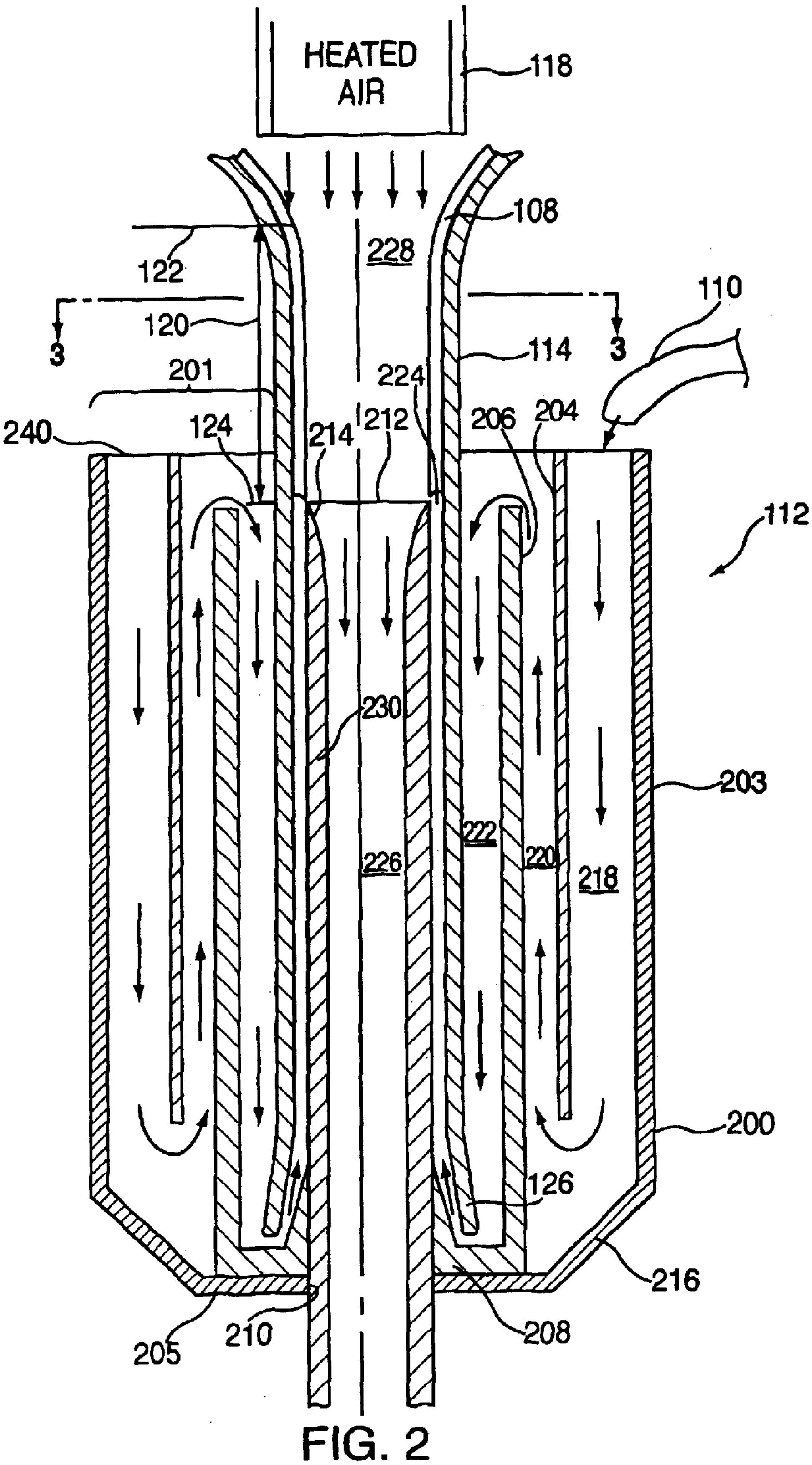
FIG. 2 depicts a cross-sectional view of the cleaning unit of the present invention.
Figure 3:
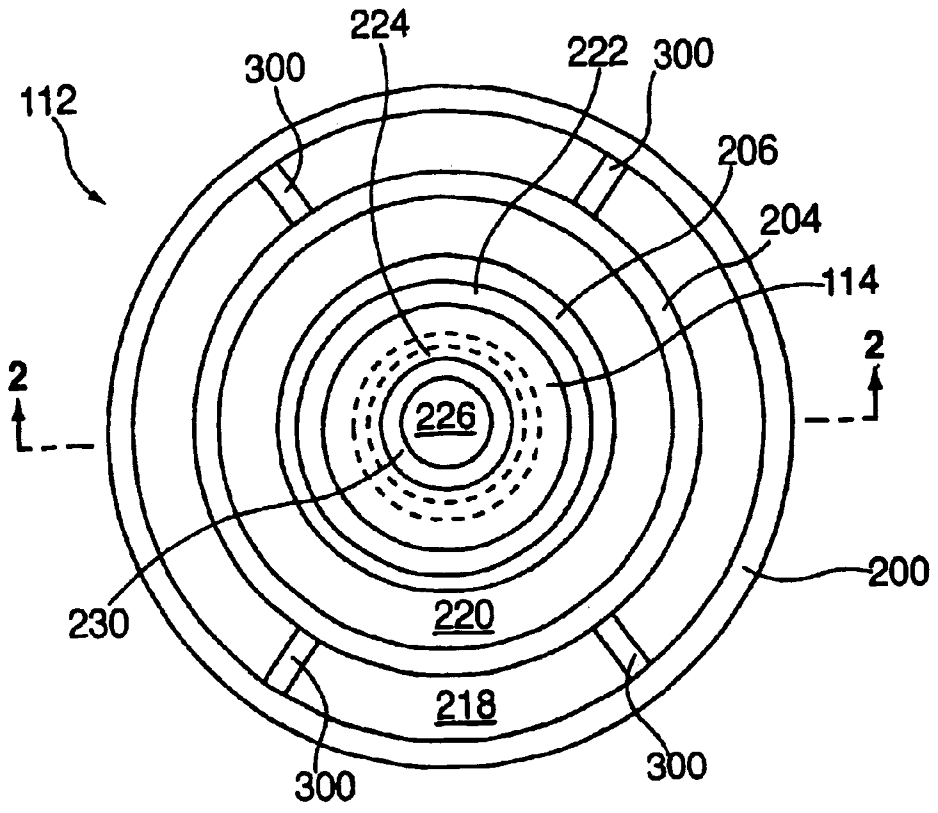
FIG. 3 depicts a top plan view of the labyrinth flow controller of FIG. 2.

FIG. 2 depicts a cross-sectional view of the cleaning unit 112 while FIG. 3 depicts a top plan view of the cleaning unit 112. To best understand the invention, the reader should simultaneously refer to both FIGS. 2 and 3 while reading the following disclosure.

The cleaning unit 112 comprises a housing 200, a drain tube 230 and a labyrinth flow controller 201. The housing 200 comprises a sidewall 203 and a bottom 205 that together define a volume in which the labyrinth flow controller 201 is positioned. The sidewall 203 is substantially cylindrical in the depicted embodiment. However, other embodiments may have non-cylindrical surfaces such as hexagonal or octagonal. The drain tube 230 extends through a bore 210 in the bottom 205 of the housing 200. The drain tube 230 extends a distance into the volume that is defined by the housing 200. The end 202 of the drain tube 230 is positioned a distance from the top of the housing 200 such that, as cleaning fluid is added to the volume, fluid will flow into the drain tube 230 before overflowing the top edge 240 of the housing 200. The end 212 of the drain tube 230 has an inner surface 214 that is contoured to facilitate laminar flow of cleaning fluid over the end 212 into the inner portion 226 of the drain tube 230.

The labyrinth flow controller 201 comprises a first baffle 204 and a second baffle 206. The first baffle 204 is mounted within the housing 200 on standoffs 300 to cause the first baffle 204 to be spaced apart from the second baffle 206 of the housing 200 as shown in FIG. 3. The first baffle 204 extends near the top edge 240 of the housing 200 and stops a distance from the bottom 205 of the housing 200. The second baffle 206 extends from the bottom 205 of the housing 200 and stops near the end 212 of the drain tube 230. As such, the baffles 204 and 206 define a first, second and third channels 218, 220 and 222, respectively. The channels cause fluid that enters from the conduit 110 to flow downward through the first channel 218, then up through the second channel 220, and then through the third channel 222. When the neck 114 of the tube 106 is inserted into the cleaning unit 112 over the drain tube 230, a fourth channel 224 is produced that extends from the flare 126 of the neck 114 along the inside of the tube neck 114 to the input end 212 of the drain tube 230. To enhance the laminar flow of fluid through the labyrinth flow controller 201, the bottom 205 of the housing 200 is contoured to be sloped, or rounded at location 216 and the fourth channel 224 is caused to be shaped to match the flare 126 of the neck 114 at a second location 208. Location standoff tabs (not shown in FIG. 2) on the outside surface of the drain tube 230 aids to position the drain tube 230 within the neck to create a desired uniform forth channel 224 between the outside surface of the drain tube 230 and the inside surface of the neck. The position of the drain tube 230 within the neck 114 establishes a distance along the neck 114 where the conductive material is removed. By fixing the distance between the yoke reference line 122 and the input end 212 of the drain tube 230, the distance 120 along the neck 114 is established.

Heated dry air is provided through conduit 118 into the neck volume 228. The heated air dries or cures the conductive coating layer 108 in the neck 114 that is not removed while the uncured conductive coating is removed by the cleaning fluid. (Essentially, a siphon effect is created by the fluid as it drains through the drain tube 230, thereby helping to draw the heated air downward toward the neck 114 and conductive coating layer 108.) Typically, deionized water suffices to remove dirt and uncured conductive coatings.

To insure that the transition from no conductive coating to conductive coating is uniform, the fluid flow through the cleaning unit 112 must have very little turbulence and the flow along the inner surface of the neck 114 of the funnel 106 should substantially be laminar. To facilitate such laminar flow, the forth channel 224 through which the fluid flows along the inside surface of the neck 114 is approximately 0.14 cm. Furthermore, within the forth channel 224 to clean the neck 114, each sequential channel 218, 220, 222, 224 is provided to create a smooth, uniform, nonturbulent laminar flow.

The housing 200 and the baffles 204, 206 of the labyrinth flow controller 201 may be fabricated of plastic, stainless steel, or some other material that is compatible with both the cleaning solution and the conductive material removed from the tube's neck 114. If the cleaning unit 112 is fabricated of plastic, then the various components of the unit are epoxied to one another to form the depicted cleaning unit 112. For stainless steel components, the components are welded in a conventional manner to form the cleaning unit 112. In one embodiment of the invention, the cleaning unit has a diameter of the housing 200 of between 15–20 cm and the unit holds a volume of cleaning fluid of approximately 3 liters.

In this illustrative unit, the first channel 218 is approximately 3.8 cm wide, the second channel 220 is approximately 1 cm wide, the third channel 222 is approximately 0.45 cm wide, the fourth channel 224 is approximately 0.14 cm and the drain tube 230 has an inner diameter of 1.3 cm.

While the foregoing is directed to the preferred embodiment of the present invention, other and further embodiments of the invention may be devised without departing from the basic scope of thereof, and the scope thereof is determined by the claims that follow. One skilled in the art can appreciate other embodiments wherein the dimensions of the channels and number of channels could be varied to accommodate differing fluid solutions and differing neck dimensions.

What is claimed is:

1. A method of cleaning the neck on a funnel of a cathode-ray tube comprising:

inserting a drain tube within said neck, the outer dimensions of said drain tube being less than the corresponding inner dimensions of said neck, wherein a gap exists between said drain tube and said neck;

directing a fluid through said gap; and draining said fluid, that was directed through said gap, through said drain tube, whereby said fluid cleans said neck.

2. The method of claim 1 wherein the directing step comprises:

supplying said fluid into a cleaning unit; and directing said fluid within said cleaning unit through a labyrinth flow controller causing fluid to flow along an inside surface of said neck.

3. The method of claim 2 wherein a material was coated onto the inside surface of said neck before the directing step, whereby said fluid removes at least a portion of said material after the directing step.

4. The method of claim 2 wherein said labyrinth flow controller further comprises a plurality of channels for directing said fluid through said cleaning unit and into said neck.

5. The method of claim 3, further comprising curing a portion of said material that is not removed by flow of said fluid after the draining step.

6. The method of claim 5 wherein heated air is continuously applied into said funnel and toward said neck during said directing and draining steps.

7. The method of claim 4, further comprising decreasing a turbulence of said fluid in each of said plurality of said channels toward said neck.

* * * * *